(12) United States Patent
Murofushi et al.

(10) Patent No.: US 7,439,865 B2
(45) Date of Patent: Oct. 21, 2008

(54) RADIO TAG ISSUING APPARATUS

(75) Inventors: Nobuo Murofushi, Susono (JP); Kouichi Sano, Ihara-gun (JP); Yasuo Matsumoto, Numazu (JP); Yasuhito Kiji, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 483 days.

(21) Appl. No.: 11/211,371

(22) Filed: Aug. 25, 2005

(65) Prior Publication Data

US 2006/0001526 A1 Jan. 5, 2006

Related U.S. Application Data

(63) Continuation of application No. PCT/JP2004/019413, filed on Dec. 24, 2002.

(30) Foreign Application Priority Data

Dec. 25, 2003 (JP) .............................. 2003-431403

(51) Int. Cl.
G08B 13/14 (2006.01)
(52) U.S. Cl. .............. 340/572.8; 340/572.4; 340/572.1; 340/10.1; 235/439
(58) Field of Classification Search ................ 340/10.1, 340/572.1, 572.4, 572.7, 572.8; 235/439
See application file for complete search history.

(56) References Cited

U.S. PATENT DOCUMENTS

| | | | | |
|---|---|---|---|---|
| 6,104,291 | A * | 8/2000 | Beauvillier et al. ....... | 340/572.1 |
| 6,327,972 | B2 * | 12/2001 | Heredia et al. ................ | 101/35 |
| 6,593,853 | B1 | 7/2003 | Barrett et al. | |
| 6,869,019 | B1 * | 3/2005 | Nagi et al. ................... | 235/492 |
| 7,102,525 | B2 * | 9/2006 | Cuperus et al. .......... | 340/572.8 |
| 7,187,293 | B2 * | 3/2007 | White et al. .............. | 340/572.8 |
| 7,327,265 | B2 * | 2/2008 | Tsujimura et al. ........ | 340/572.7 |

(Continued)

FOREIGN PATENT DOCUMENTS

JP 11-308039 * 5/1999

(Continued)

OTHER PUBLICATIONS

International Search Report for PCt/JP04/19413, dated Jan. 20, 2005; ISA/JP.

(Continued)

*Primary Examiner*—Jeff Hofsass
*Assistant Examiner*—Anne V. Lai
(74) *Attorney, Agent, or Firm*—Harness, Dickey & Pierce, P.L.C.

(57) ABSTRACT

A mount sheet having a plurality of radio tags attached at an interval to it is run over a radio communicating section. The radio communicating section has a metal member providing a conveying surface with a slit formed therein. A dielectric member is arranged on a lower surface of the metal member with a projecting section inserted into the slit and, by doing so, the top surface of the projecting section is set flush with the top surface of the metal member. An antenna of the radio communicating section is located beneath the projecting section of the dielectric member and this antenna is held within the metal case. When any radio tag being an object of a radio communication is located over the slit, the radio communicating section positively makes radio communication with the radio tag through the antenna.

7 Claims, 6 Drawing Sheets

U.S. PATENT DOCUMENTS

2001/0048028 A1  12/2001  Sasaki et al.

FOREIGN PATENT DOCUMENTS

| JP | 2000-187713 | | 7/2000 |
|---|---|---|---|
| JP | 2001-143032 | | 5/2001 |
| JP | 2001-225921 | | 8/2001 |
| JP | 2001-352208 | | 12/2001 |
| JP | 2002-016418 | | 1/2002 |
| JP | 2002-230499 | | 8/2002 |
| JP | 2002-230499 A | | 8/2002 |
| JP | 2002-373315 | * | 12/2002 |
| JP | 2002-373315 A | | 12/2002 |
| JP | 2002 373315 A | | 12/2002 |
| JP | 2003-76947 | * | 3/2003 |
| JP | 2003-076947 | | 3/2003 |
| JP | 2003 076947 A | | 3/2003 |
| JP | 2003-076947 A | | 3/2003 |
| JP | 2003-140548 | | 5/2003 |
| JP | 2003-140548 A | | 5/2003 |
| WO | WO 02/088762 A2 | | 11/2002 |
| WO | WO 03/076405 A1 | | 9/2003 |

OTHER PUBLICATIONS

Communication (with translation) from Japanese Patent Office re: related application.

Communication from European Patent Office re: related application.

Translation of the International Preliminary Report on Patentability for PCT/JP2004/019413.

Communication with translation from Chinese Patent Office re: related application.

* cited by examiner

US 7,439,865 B2

RADIO TAG ISSUING APPARATUS

CROSS-REFERENCE TO RELATED APPLICATIONS

This is a Continuation Application of PCT Application No. PCT/JP2004/019413, filed Dec. 24, 2004, which was published under PCT Article 21(2) in Japanese.

This application is based upon and claims the benefit of priority from prior Japanese Patent Application No. 2003-431403, filed Dec. 25, 2003, the entire contents of which are incorporated herein by reference.

BACKGROUND OF THE INVENTION

1. Field of the Invention

The present invention relates to a radio tag issuing apparatus in which a mount sheet having a plurality of radio tags including an IC chip and antenna is conveyed to allow information to be read from, and written into, the radio tag by radio communication.

2. Description of the Related Art

Conventionally, a radio tag issuing apparatus has been known in which a radio tag called an RFID (Radio Frequency Identification) tag is issued. As set out in JPN PAT APPLN KOKAI PUBLICATION NO. 2003-140548, such a radio tag issuing apparatus has the function of effecting printing on a continuous labeling sheet with a plurality of radio tags attached at a predetermined interval thereto and the function of writing information into the radio tag. By providing a variable range communicatable with the radio tag it is possible to move only a write-operation target radio tag into the communicatable range.

BRIEF SUMMARY OF THE INVENTION

As a method for providing a variable range in which communication can be made with a radio tag, a method is known of controlling the transmission power from a radio communicating means for writing information into a radio tag. In this method, there is a possibility that, even if the transmission power is constant, communication will be inadvertently made with an adjacent radio tag due to a variation in an electric power level at which communication can be made with the radio tag. Further, where an antenna for effecting communication with the radio tag is provided within the radio tag issuing apparatus, it has been difficult to make communication with a write-operation target radio tag only because the radio wave is reflected on the metal parts, etc., within the radio tag issuing apparatus.

The present invention provides a radio tag issuing apparatus which can positively communicate with a target radio tag only out of a plurality of radio tags attached at an interval to a mount sheet.

The present invention is characterized by comprising conveying means configured to convey a mount sheet having a plurality of radio tags attached at an interval thereto to allow information to be read from, and written into, the radio tag in a noncontacting fashion, the radio tag having an electronic circuit with an antenna and storage section set thereon, radio communicating means configured to have an antenna and make radio communication through the antenna to allow the information to be read from, and written into, the storage section of the radio tag, a first material configured to be located to a position where the radio communicating means makes radio communication with the radio tag, and a second material configured to be located to a position adjacent the radio tag with which the radio communicating means makes radio communication, the second material being different from the first material.

DETAILED DESCRIPTION OF THE INVENTION

The embodiments of the present invention will be described below with reference to the drawings.

First Embodiment

Figure 1:
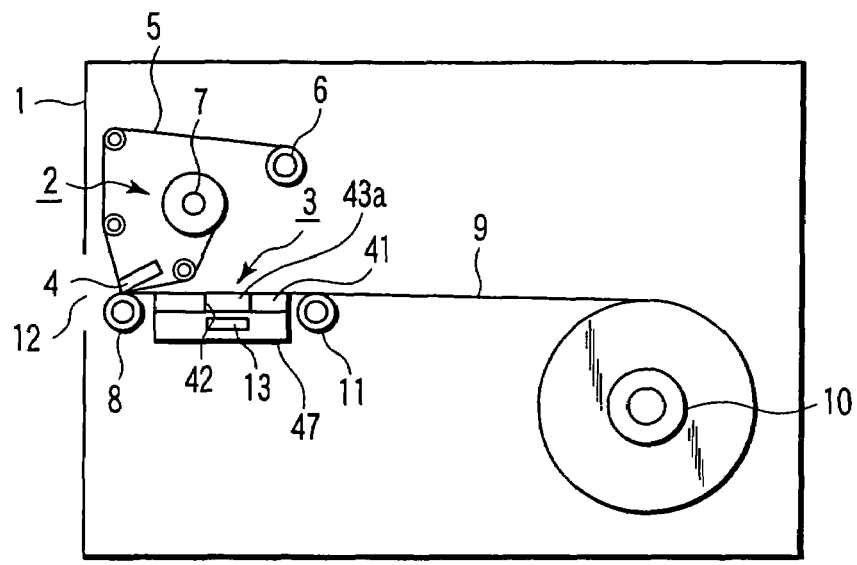
FIG. 1 is a view diagrammatically showing an arrangement of a radio tag issuing apparatus according to a first embodiment of the present invention.

FIG. 1 is a diagrammatic view showing a radio tag issuing apparatus. Within a housing 1 are provided a printing section 2 for printing on a radio tag and a radio communicating section 3 for making radio communication with the radio tag.

The printing section 2 has a thermal head 4 having a larger number of heat generating elements arranged along a width direction and an ink ribbon 5. The ink ribbon 5 is pulled out of a ribbon core 6 and, on its way, contacted with the thermal head 4 and finally wound around a ribbon core 7. The thermal head 4 is so mounted as to be pressed against a platen roller 8 with the ink ribbon 5 in between.

A plurality of radio tags are attached to a mount sheet at a predetermined interval. The mount sheet 9 is wound around a roll sheet core 10 and it is pulled out from the roll sheet core 10. The leading edge of the mount sheet 9 is issued from an issuing section 12 by passing the radio communicating section 3 and platen roller 8. The radio communicating section 3 has, within it, an antenna 13 for communicating with the radio tag by wireless.

Figure 2:
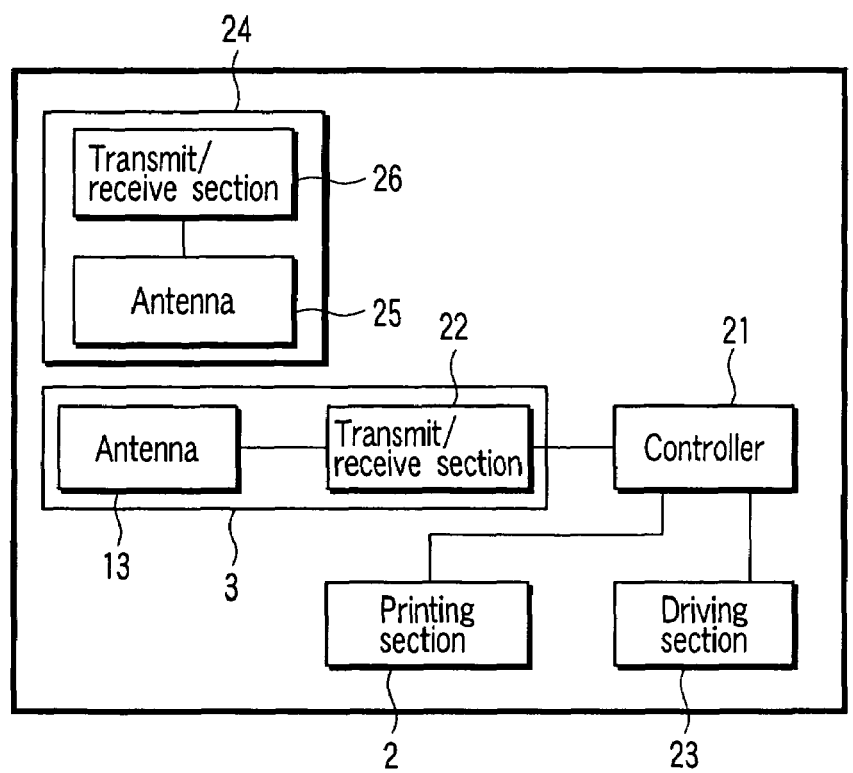
FIG. 2 is a block diagram showing a main arrangement of a radio tag issuing apparatus according to the embodiment.

FIG. 2 is a block diagram showing a control structure of the radio tag issuing apparatus. In the radio tag issuing apparatus, a controller 21 for controlling each part is provided in the apparatus. The controller 21 controls a transmit/receive section 22 in the radio communicating section 3, the printing section 2 for printing on the surface of the radio tag, and a driving section 23 for driving the ribbon cores 6, 7, platen roller 8, conveying roller 11 and roll sheet core 10.

The radio tag 24 has an antenna 25 and transmit/receive section 26. The transmit/receive section 26 includes a storage section for storing an ID and other data. The writing/reading of the information into/out of the radio tag 24 is performed by the transmit/receive section 22 of the radio communicating section 3 through the antenna 13.

The transmit signal from the transmit/receive section 22 in the radio communicating section 3 is radiated as a radio wave from the antenna 13. Upon the reception of a transmit signal by the antenna 25 from the transmit/receive section 22, the radio tag 24 allows it to be transferred to the transmit/receive section 26 in it. The transmit/receive section 26 takes out the information from the received signal and performs an operation corresponding to this information. Further, the radio tag 24 transmits a signal from the transmit/receive section 26 via the antenna 25 and the transmit signal is sent out to the transmit/receive section 22 in the radio communicating section 3 through the antenna 13.

Figure 3:
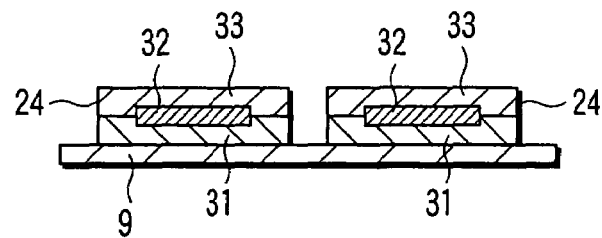
FIG. 3 is a cross-sectional view showing a structure of a mount sheet and radio tag in the embodiment.

FIG. 3 is a cross-sectional view showing a plurality of radio tags 24 attached to the mount sheet 9 at a predetermined interval. The radio tag 24 is formed on a bonding layer 31, a radio tag inlet 32 is placed on the bonding layer, and a printing layer 33 is formed on a resultant layer. The upper surface of the printing layer 33 has a printing surface where printing is made. The bonding layer 31 of the radio tag 24 is made of adhesive and can be peeled off the mount sheet 9. The radio tag inlet 32 includes an IC chip having the transmit/receive section 26 and the antenna 25.

Figure 4:
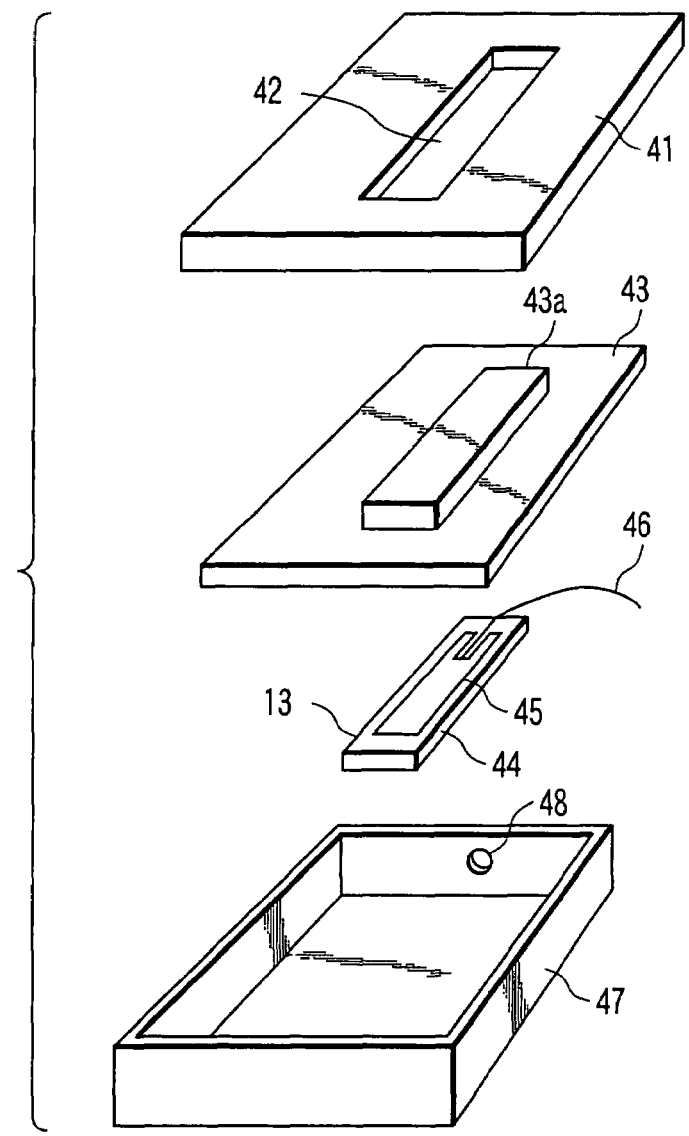
FIG. 4 is an exploded perspective view showing an arrangement near an antenna of a radio communicating section of the embodiment.

FIG. 4 is an exploded perspective view showing a structure near the antenna 13 of the radio communicating section 3. A metal member 41 provides a conveying surface and a slit 42 is formed at a central area of the metal member 41. Below the metal member 41 is placed a dielectric member 43. The dielectric member 43 has a projecting section 43a at the central area which is inserted from below the slit 42. In the state in which the dielectric member 43 is set in intimate contact with the lower surface of the metal member 41, the upper surface of the projecting section 43a is flush with the upper surface of the metal member 41. That is, the upper surface of the projecting section 43a provides, like the upper surface of the metal member 41, the conveying surface of the mount sheet 9. The dielectric member 43 is made of a first material and the metal member 41 is made of a second material.

Below the projecting section 43a formed on the dielectric member 43, the antenna 13 of the radio communicating section 3 is placed opposite the radio tag being a target of the radio communicating. The antenna 13 has a radiating section 45 on a substrate 44. The rear surface of the substrate 44 is at a ground plane over its whole surface. A core of a coaxial cable 46 is connected to the end of the radiating section 45 and a mesh-like outer conductor of a coaxial cable 46 is connected to the ground plane.

The antenna 13 is enclosed in a metal case 47 in a state to be opened in a radio tag direction only. The coaxial cable 46 is externally extended from a hole 48 in a sidewall of the metal case 47. The end of the coaxial cable 46 extended out of the metal case 47 is connected to the transmit/receive section 22. As the antenna 13 use is made of a planar patch antenna whose rear end is set to the ground plane. By doing so, the direction in which the directivity of a radiating radio wave is strong can be set to an up direction, that is, to the projecting section 43a of the dielectric member 43. Further, the radio wave can be shielded by the metal case 47 from being radiated both sideways and in a down direction. Thus it is possible to radiate a radio wave only in an up direction.

Figure 5:
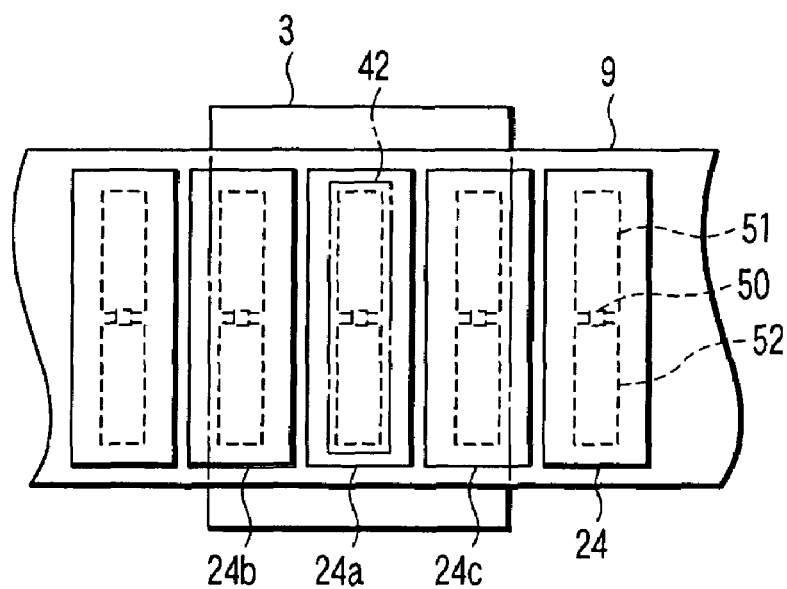
FIG. 5 is a plan view showing a relation among the mount sheet, radio tag and conveying surface in the embodiment.

FIG. 5 is a plan view showing the mount sheet 9 conveyed on the radio communicating section 3 and having a plurality of radio tags 24 attached at a predetermined intervals to it. The radio tag inlet 32 of the respective radio tag 24 has an IC chip 50 and antennas 51, 52 arranged at opposite ends. The sizes of the slits 42 as indicated by a dot-dash line in the Figure are so set as to be greater than the outer shape of the antenna section of the radio tag 24 but smaller than the outer shape of the radio tag 24.

When the antenna section of the radio tag 24 is positioned just over the slit 42, the radio communicating section 3 can make radio communication with the radio tag 24a over the slit 42. That is, the projecting section 43a of the dielectric member 43 is present between the antenna 13 of the radio communicating section 3 and the radio tag being a target of the radio communication.

At this time, the antenna sections of those radio tags 24b, 24c adjacent the radio tag 24a are located on the conveying surface of the metal member 41 of the communicating section 3. That is, the metal member 41 is located between the radio communicating section 3, on one hand, and other radio tags 24b, 24c, on the other, which are adjacent the radio tag 24a with which the radio communicating section 3 makes communication.

The radio tags 24b, 24c are located on the metal member 41 and there arises a change in the characteristics of the antennas of the radio tags 24b, 24c and an electric power energy generated in the antenna becomes smaller. This fails to start the IC chip 50 and radio communication cannot be made with these tags. On the other hand, the radio tag 24a with which radio communication is made is located over the slit 42, that is, over the projecting section 43a serving as the dielectric member, and it is possible to effectively make radio communication even under any feeble electric power from the radio antenna of the radio communicating section 3.

In this way, it is possible to make radio communication with the radio tag 24a serving as a target of radio communication only over the slit 42. There is no risk that any radio communication will erroneously made with the adjacent radio tags 24b, 24c.

Although, in this embodiment, the conveying surface of the mount sheet 9 has been explained as being formed of a metal member 41, the present invention is not restricted thereto and use may be made of other than the metal member. In short, use may be made of a material different in dielectric constant from the dielectric member 43. If, for example, a material having a relative dielectric constant of, for example, about 3 is used as the dielectric member 43, a material having a relative dielectric constant as high as about 10 may be used as a member providing a conveying surface.

Although, in the above-mentioned embodiment, an explanation has been made about a structure having a projecting section 43a formed on the dielectric member 43 and a slit 42 in which the projecting section 43a is inserted, the present invention is not restricted thereto and, in place of forming any projecting section 43a on the dielectric member 43, a space in the slit 42 is left as such, that is, as an air layer. In this case, the air layer provides a first material. If, in this case, the slit has a larger width, then the mounting sheet 9 is liable to be caught there and the slit width may be made as near-equal in size as the shape of the antenna section of the radio tag 24.

In this way, on the radio tag 24 attached to the mount sheet 9, information is written by the radio communicating section 3 and, on the upper surface of the printing layer 33 of the radio tag 24, it is printed as, for example, a bar code by means of the printing section 2 and the tag is delivered out of the issuing section 12.

Although an explanation has been made about the way of effecting printing on the surface of the radio tag, use may be made of a structure in which only an inlet of a radio tag is attached to a mount sheet and information is simply written into a storage section of the radio tag.

Second Embodiment

The same reference numerals are employed to designate the same parts as those of the first embodiment and any further explanation of them is omitted.

Figure 6:
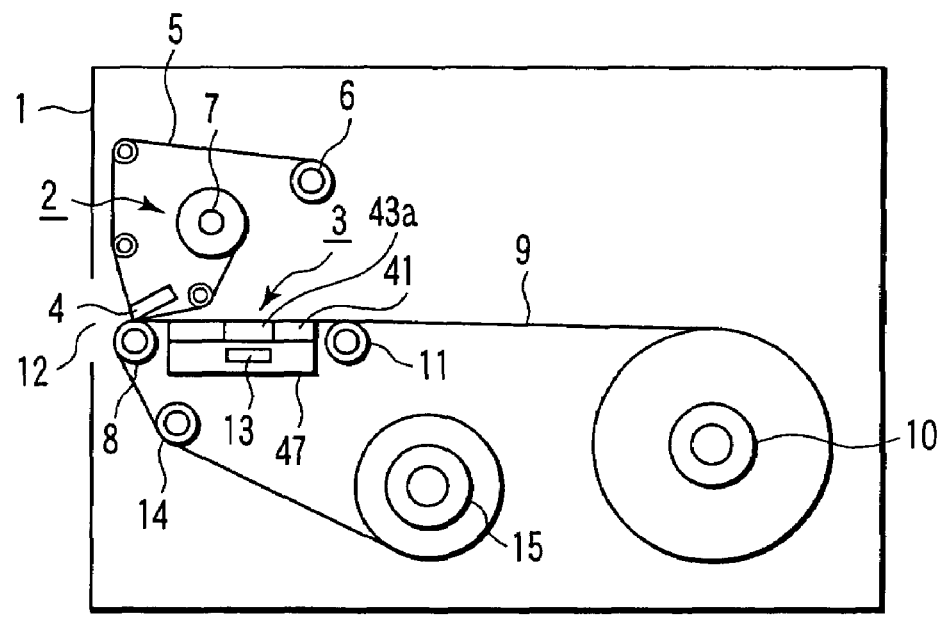
FIG. 6 is a diagrammatic view showing an arrangement of a radio tag issuing apparatus according to a second embodiment of the present invention.

In the second embodiment, as shown in FIG. 6, the leading edge of a mount section 9 sent out from a roll sheet core 10 is sequentially passed through a conveying roller 11, radio communicating section 3 and platen roller 8 and it is turned back downward past a conveying roller 14 and wound up around a roll sheet core 15.

By such a structure, the mount sheet 9, after effecting write-and print-operation on the radio tag 24, is wound up around a roll sheet core 15. A rolled mount sheet 9 can later be detached from the roll sheet core 15. The mount sheet 9 removed from the roll sheet core 15 is carried to a place where person can attach a radio tag 24. There, a radio tag 24 can be removed from the mount sheet 9 and attached to a product, etc.

Even if the mount sheet 9 is turned back downward from the platen roller 8 and wound around the roll sheet core 15, the radio communicating section 3 prevents a radio wave which is radiated from the antenna 13 from being radiated both sideways and downward since the radio communicating section 3 has a metal case 47 arranged beneath. Thus, the radio tag 24 on the mount sheet 9 wound up around the roll sheet core 15 can be prevented from being erroneously read-and write-operated by the radio communicating section 3.

Even in this embodiment, it is possible to obtain not only the above-mentioned advantages but also other advantages as set out above.

Third Embodiment

The same reference numerals are employed to designate the same parts as those of the above-mentioned embodiment and any further explanation of them is omitted.

Figures 7, 8:
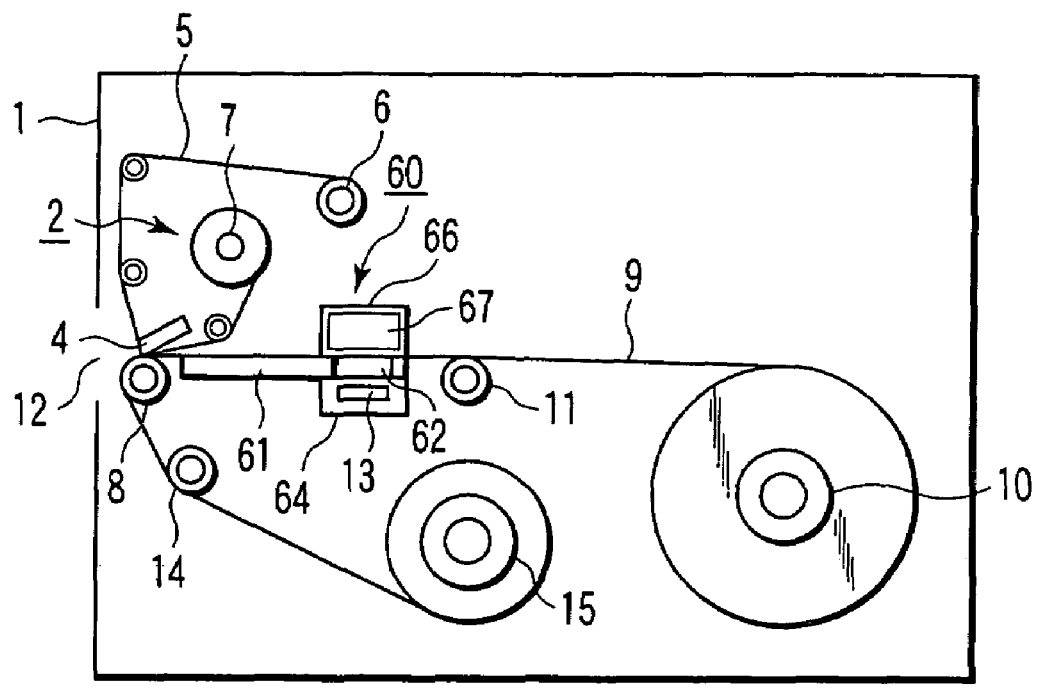
FIG. 7 is a diagrammatic view showing an arrangement of a radio tag issuing apparatus according to a third embodiment of the present invention.
FIG. 8 is a cross-sectional view showing an arrangement near an antenna of a radio communicating section in the embodiment.
Figure 9:
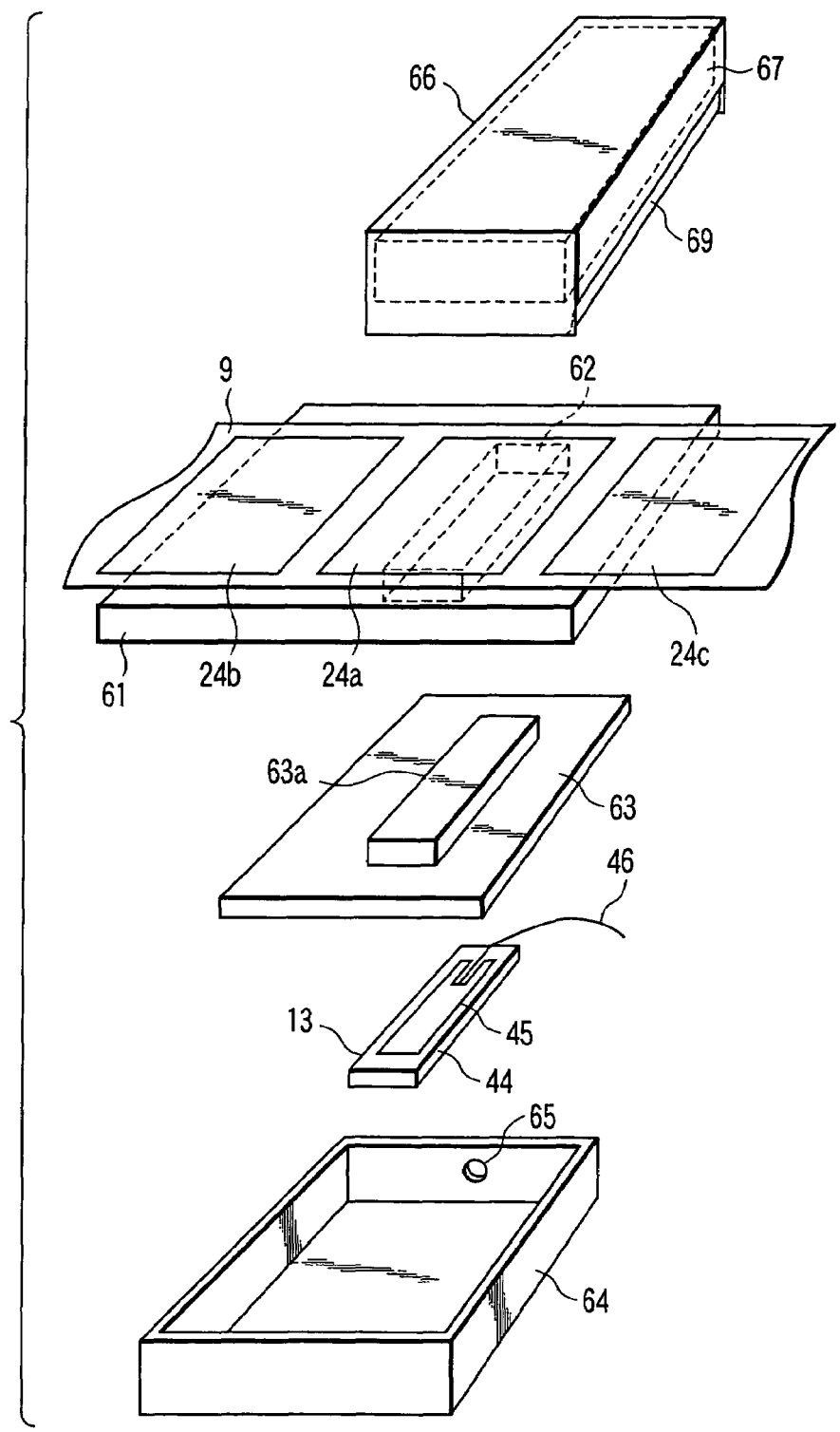
FIG. 9 is an exploded perspective view showing an arrangement near an antenna of a radio communicating section in the embodiment.

As shown in FIG. 7, as the radio communicating section use is made of a radio communicating section 60. As FIGS. 8 and 9 show, the radio communicating section 60 has a metal member 61 that defines a conveying surface. The metal member 61 has a slit 62, which is located closer to the conveying roller 11 than to the center part of the metal member 61. A dielectric member 63 lies below the slit 62 of the metal member 61. The dielectric member 63 has a projecting section 63a on the upper surface. The projecting section 63a is inserted in the slit 62 from below. In a state in which the dielectric member 63 is closely set to the lower surface of the metal member 61, the upper surface of the projecting section 63a is flush with the upper surface of the metal member 61. That is, the upper surface of the projecting section 63a together with the upper surface of the metal member 61 provides a conveying surface of the mount sheet 9.

An antenna 13 is located beneath the projecting section 63a of the dielectric member 63. As in the case of the above-mentioned embodiment, the antenna 13 has a radiating section 45 on a substrate 44 and a coaxial cable 46 is connected to the end of the radiating section 45. The antenna 13 is held in a metal case 64 and the coaxial cable 46 is extended outwardly past a hole 65 in a sidewall of the metal case 64. As the antenna 13 use is made of a planar patch antenna with a reverse surface made at a ground plane. By doing so, the direction in which the directivity of a radiating radio wave is strong is an up direction, that is, it can be oriented toward the projecting section 63a of the dielectric member 63. A radio wave radiating both sideways and in a downward direction can be shielded by the metal case 64 and hence it is possible to radiate a radio wave only toward an up direction.

A metal case 66 lies above the slit 62 of the metal member 61. The metal case 66 surrounds the radio tag 24 and opens only to the antenna 13 of the radio communicating section 60. The opening of the metal case 66 is opposed to the slit 62. The metal case 66 contains a dielectric member 67.

The metal case 66 has its lateral side greater in length than its front/back side in a mount sheet 9 conveying direction and the metal case 66 has its lateral side's lower end portions located near both the lateral side portions of the metal member 61.

The metal case 66 has its front/back side' lower end portions, that is, such lower end portions in the mount sheet 9 conveying direction, located at a level higher than the conveying surface provided by the metal member 61 and, in this state, curtain-like metal sheets 68, 69 are attached to the corresponding lateral sidewalls. The respective metal sheets 68, 69 are formed of a soft member capable of shielding an electromagnetic wave and these sheets are set to an extent lightly contacting with a surface of a running mount sheet 9. There is no risk that any radio tag 24 attached to the mount sheet 9 will be injured by the metal sheets 68, 69. By doing so, the radio tag 24a is enclosed by the metal case 66 and metal sheets 68, 69 and the electric power of an electromagnetic wave leaking out of the metal decays.

As shown in FIG. 9, when the antenna section of the radio tag 24 comes just over the slit 62, the radio communicating section 60 can make communication with a radio tag 24a just over the slit 62 and, at this time, the antenna sections of those radio tags 24b, 24c adjacent the radio tag 24a are situated on the conveying surface of the metal member 61 of the radio communicating section 60.

Since the antenna section of the radio tag 24b is situated over the metal member 61, the characteristics of the antenna vary and the electric power generated at the antenna becomes small. Thus, the radio tag 24b fails to start the IC chip. Further, the electric power of an electromagnetic wave supplied to the radio tag 24c decays and hence the radio tag 24c cannot start the IC chip.

The radio tag 24a with which radio communication is made is located over the slit 62, that is, over the dielectric material, and it is possible to effectively make radio communication under any feeble electric power from the antenna 13 in the radio communicating section 60. Under such electric power, the radio communicating section 60 cannot make radio communication with the radio tags 24b, 24c.

A metal case 66 with a dielectric member 67 held in it is positioned above the radio tag 24a over the slit 62. If the distance between the radio tag 24a and the top surface of the metal case 66 is made about one quarter the wave length with which radio communication is made, then it is possible to obtain better characteristics. Since, by doing so, a radio wave radiating from the antenna 13 and directly arriving at the radio tag 24a and a radio wave reflected on the top of the metal case 66 and returned back to the radio tag 24a reinforce each other in a combined fashion, it is possible to make communication with the radio tag 24a in a favorable fashion.

Further, the upper surface of the radio tag 24a is also shielded by the metal case 66 and metal sheets 68, 69 and it is possible to prevent a radio wave from being radiated to other than a communication-wanted area. By doing so, it is possible to suppress any electric power which might otherwise be consumed by radiation. Since the wavelength of the radio wave depends upon the dielectric constant and, by the use of the dielectric member 67, the wave length of the radio wave is shortened in the dielectric material, the high direction of the metal case 66 can be lowered in comparison with the case where no dielectric member 67 is provided.

It is, of course, possible to obtain not only the above advantages but also the same advantages as set out above in connection with the previous embodiments.

Although, in this embodiment, the conveying surface of the mount sheet 9 is provided by the metal member 61, the present invention is not restricted thereto and use may be made of a member other than the metal one. In short, use may be made of a member which is different is dielectric constant from the dielectric member 63.

Fourth Embodiment

In this embodiment, the same reference numerals are employed to designate parts corresponding to those shown in the previous embodiment and any further explanation of them is, therefore, omitted.

Figure 10:
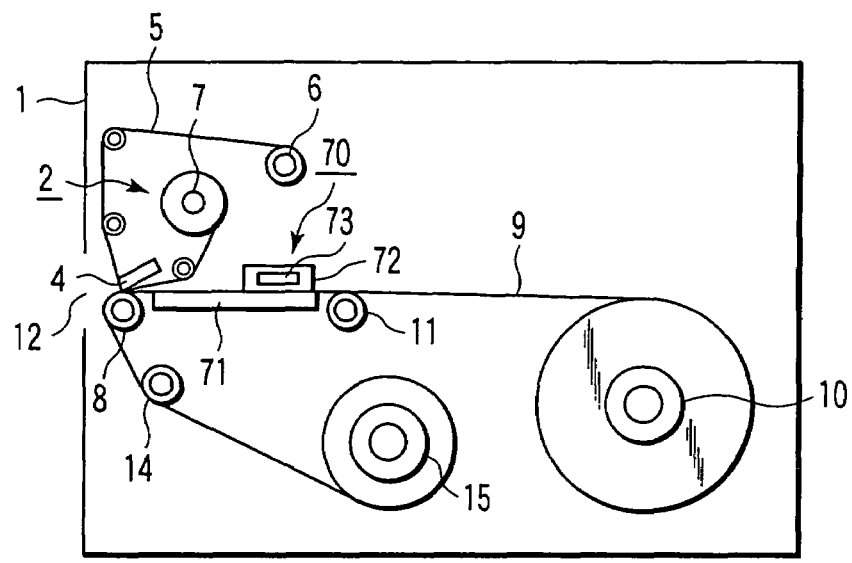
FIG. 10 is a diagrammatic view showing an arrangement of a radio tag issuing apparatus according to a fourth embodiment of the present invention.
Figure 11:
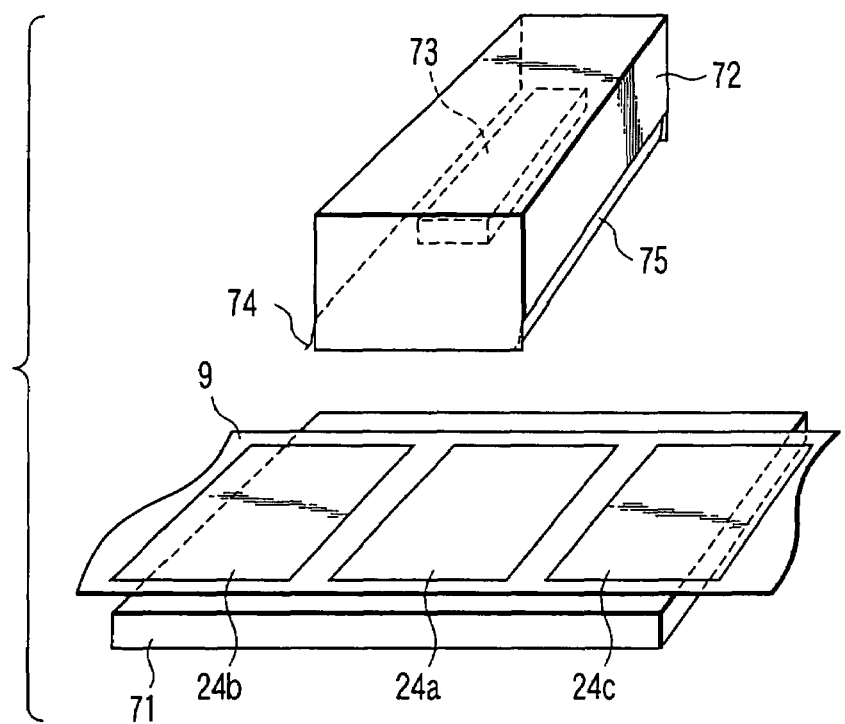
FIG. 11 is a diagrammatic view showing an arrangement near an antenna of a radio communicating section in the embodiment above.

In this embodiment, as a radio communicating section use may be made of a radio communicating section 70 as shown in FIG. 10. In this radio communicating section 70 as shown in FIG. 11, a metal member 71 is used to provide a conveying surface and no slit is formed in the metal member 71. Above the metal member 71, a box-like metal case 72 is located as a metal enclosing member with its opening section oriented to the conveying surface side. An antenna 73 is located within the metal case 72 and has the same structure as that of the antenna 13 of the previous embodiment. In this connection it is to be noted that its radiating section on a substrate is oriented downward, that is, to the conveying path side.

The metal case 72 is such that its lateral sidewall side is made larger in length than its front/back sidewall in a mount sheet 9 conveying direction. Further, the metal case 72 is located with its lateral sidewall's lower end portions contacting with those surface portions at and near both ends of the metal member 71.

The metal case 72 has its front/back side's lower end portions, that is, such lower end portions in the mount sheet 9 conveying direction, located at a higher position than the conveying surface provided by the metal member 71 and curtain-like metal sheets 74, 75 are attached to the lateral sidewalls of the metal case 72. The respective metal sheets 74, 75 are formed of a soft member capable of shielding an electromagnetic wave and these sheets are set to an extent lightly contacting with a surface of a running mount sheet 9. Therefore, there is no risk that any radio tag 24 attached to the mount sheet 9 will be injured by the respective metal sheets 74, 75.

In order to make radio communication with the radio tag 24a located beneath the antenna 73, it is necessary to set any electric power of a radio wave radiating from the antenna 73 to be larger than in the previous embodiments. In this case, however, the radio tag 24a is enclosed with the metal case 72 and metal sheets 74, 75 and the electric power of a radio wave leaking out of the metal decays. Thus, there is no risk that, with the adjacent radio tags 24b and 24c, the radio communicating section 70 will make radio communication through the antenna 73.

It is of course possible to obtain an advantages even in this embodiment as well as the advantages as set out in connection with the previous embodiments.

The present invention is such that a plurality of radio tags including an IC chip and antenna are conveyed in a state to be attached to a mount sheet and information is sequentially read from, or written into, the respective radio tag on the conveying mount sheet, so that an issuing radio tag can be used by being attached to a product and so on.

What is claimed is:

1. A radio tag issuing apparatus comprising:
   conveying means configured to convey a mount sheet having a plurality of radio tags attached at an interval thereto to allow information to be read from, and written into, the plurality of radio tags non-contactingly, the plurality of radio tags each having an electronic circuit with an antenna and a storage section set thereon;
   radio communicating means configured to have an antenna and make radio communication through the antenna of the radio communicating means to allow the information to be read from, and written into, the storage section of each of the plurality of radio tags;
   a first dielectric member configured to be located at a position where the radio communicating means makes the radio communication with at least a first radio tag of the plurality of radio tags; and
   a first metal member located adjacent to the first radio tag, wherein an upper surface of the first dielectric member is flush with an upper surface of the first metal member for providing a conveying surface of the mount sheet.

2. The radio tag issuing apparatus according to claim 1, wherein the antenna of the radio communicating means is located at an opposite side of the first dielectric member to the first radio tag.

3. The radio tag issuing apparatus according to claim 1, wherein directivity of the antenna of the radio communicating means is reinforced in a direction of the first dielectric member.

4. A radio tag issuing apparatus according to claim 1, wherein the first metal member encloses the antenna of the radio communicating means and has an opening in a direction toward the first radio tag.

5. The radio tag issuing apparatus according to claim 1, wherein the first metal member encloses the first radio tag and has an opening in a direction of the antenna of the radio communicating means.

6. The radio tag issuing apparatus according to claim 5, further comprising a second dielectric material that is provided within the first metal member.

7. The radio tag issuing apparatus according to claim 1, wherein a part of the first dielectric member is in close contact with a lower surface of the first metal member.

* * * * *